Patented Apr. 15, 1947

2,419,031

UNITED STATES PATENT OFFICE 2,419,031

COFFEE COMPOSITION

Frederick Pollack, Kew Gardens, N. Y.

No Drawing. Application October 5, 1944,
Serial No. 557,371

2 Claims. (Cl. 99—152)

This invention relates to a coffee composition and particularly to a roasted and ground coffee comprising intimately admixed, substantially dry lithium carbonate serving as flavor preserving agent.

In the preparation of coffee for commercial distribution, the seeds of the fruit from the *Coffea arabica* or other species of coffee tree are dried, pulp and parchment removed, and the beans preferably stored for some time in the dry condition, to cause improvement of the flavor. The dry beans are later roasted and ground to powder or granular form.

The coffee prepared in standard manner undergoes rapid deterioration of the flavor. The coffee, best in flavor and taste directly after the roasting process, quickly develops objectionable flavor and taste that decrease the palatability to the user and in some instances cause slight gastric disturbances.

Many researches have been made in an effort to find some means of overcoming this problem of long standing, particularly staling of the coffee after grinding. Thus there have been proposed or used vacuum canning of the ground coffee, replacement of air in the containers by carbon dioxide or nitrogen, the use of oat flour in the paper wrappers for coffee, and the treatment of the ground coffee with alcohol vapors, oat flour and corn flour, the cereal flours being known to contain an antioxidant.

Regardless of all of the efforts that have been made, it has been considered necessary for the best flavor and taste to resort heretofore to freshly roasted and ground coffee. As a result, there is a very large business in the distribution of coffee immediately after roasting and grinding to large users for whom such service is feasible. For the small retail user generally this is economically impracticable.

The present invention provides a simple and inexpensive composition for preventing development of off flavor and taste in roasted ground coffee.

Proportions that have been used to advantage are about 1 part by weight of the flavor preserving agent consisting of lithium carbonate to 100 parts of the coffee. Variations from this proportion may be made. When the proportion of the said agent used is too low, the preserving effect is not complete during the usual period of holding of the coffee before use. When excessively large amounts of the agent are used, there is an unnecessary waste of material without a compensating gain in the results. For most purposes the proportion of the flavor preserving agent should be within the approximate range 0.3 to 3 parts for 100 parts by weight of the ground and dried coffee.

The lithium carbonate serving as the flavor preserving agent should be present in the coffee as soon as possible after the coffee is ground. Thus it may be thoroughly admixed immediately after grinding of coffee. Also, the agent may be added to the roasted beans before grinding although the intergrinding thus effected is not necessary. If added to the coffee a substantial period of time after the grinding has been made, the agent is effective from that time forward but, in this instance, there is development of objectionable flavor and taste during the period between the grinding and the addition of the flavor preserving agent.

The coffee including the admixed preserving agent has been stored in oiled paper bags for over a year, with retention of satisfactory flavor and freshness by the coffee.

Also the preserving agent may be admixed with ground coffee compositions that are to be vacuum packed so as to cause retention of the top flavors which are more susceptible to deterioration than other flavors in the coffee. However, the use of my flavor preserving agent makes vacuum packing unnecessary for most purposes and broadens the field of the oiled paper and like less expensive packages for the retail distribution of coffee.

Lithium carbonate used as the preserving agent avoids earthy taste, in spite of the fact that lithium carbonate is sparingly but appreciably soluble in water (about 0.7 part to 100 parts of boiling water).

Once the results of the use of flavor preserving agent of the kind described has been noted, various explanations may be advanced to explain the results obtained. It is considered that the flavor preserving agent acts as an anticatalyst destroying materials as formed and which unless removed are positive catalysts of the development of off flavor and taste. More specifically, the flavor preserving agent neutralizes acidity present after roasting or formed on aging and which, if not neutralized, would catalyze development of off flavor.

It will be understood that it is intended to cover all changes and modifications of the example of the invention herein chosen for the purpose of illustration which do not constitute departure from the spirit and scope of the invention.

What I claim is:

1. A coffee composition comprising roasted and ground coffee and a substantially dry flavor preserving agent intimately mixed with the coffee, the said agent being lithium carbonate in the proportion of about 0.3 part to 3 parts for 100 parts by weight of the coffee.

2. A coffee composition comprising roasted and ground coffee and a substantially dry flavor preserving agent intimately mixed with the coffee, the said agent being finely divided lithium carbonate.

FREDERICK POLLACK.

REFERENCES CITED

The following references are of record in the file of this patent:

UNITED STATES PATENTS

| Number | Name | Date |
|---|---|---|
| 312,516 | Schilling | Feb. 17, 1885 |
| 2,238,149 | Aeckerle | Apr. 15, 1941 |
| 680,889 | Schutz | Aug. 20, 1901 |